Jan. 24, 1967  W. V. MYER  3,300,062
LIFTING APPARATUS
Filed Jan. 25, 1965  8 Sheets-Sheet 1

Wilbur V. Myer
INVENTOR.

BY *Clarence A. O'Brien*
*and Harvey B. Jackson*
Attorneys

Jan. 24, 1967   W. V. MYER   3,300,062
LIFTING APPARATUS
Filed Jan. 25, 1965   8 Sheets-Sheet 5

Wilbur V. Myer
INVENTOR.

Jan. 24, 1967   W. V. MYER   3,300,062
LIFTING APPARATUS
Filed Jan. 25, 1965   8 Sheets-Sheet 6

Wilbur V. Myer
INVENTOR.

BY Clarence A. O'Brien
and Harvey B. Jackson
Attorneys

Jan. 24, 1967  W. V. MYER  3,300,062
LIFTING APPARATUS
Filed Jan. 25, 1965  8 Sheets-Sheet 8

Wilbur V. Myer
INVENTOR.

United States Patent Office 3,300,062
Patented Jan. 24, 1967

3,300,062
LIFTING APPARATUS
Wilbur V. Myer, Rte. 4, Box 2, Sallisaw, Okla. 74955
Filed Jan. 25, 1965, Ser. No. 427,579
25 Claims. (Cl. 214—1)

The present invention is generally concerned with building construction, and is more particularly directed toward lifting apparatus to be utilized in tilting up preformed building walls from a first horizontal position lying on the ground to a second vertical erected position.

It is a primary object of the instant invention to provide lifting apparatus which, through the unique construction thereof, is capable of efficiently and safely erecting extremely heavy precast concrete walls without danger to either the operator of the apparatus or to the wall itself.

In conjunction with the above object, it is also a highly significant object of the instant invention to provide lifting apparatus which is itself of a compact and lightweight construction which enables its use within extremely limited spaces without detracting from its ability to raise great loads.

Further, it is an important object of the instant invention to provide lifting apparatus wherein relatively long precast concrete walls, up to thirty-six to forty feet, can be safely erected utilizing a single centrally located gin or gin pole.

In order to enable the utilization of a single gin pole in erecting elongated walls, the instant invention also contemplates, and has for one of its objects, the provision of a lift force spreader or weight distributing unit for effecting a rigidification of the wall and an equal distribution of the gin pole lift force so as to avoid any tendency for the wall to buckle or crack as it is being tilted up upon the lower edge thereof.

Also, it is an object of the instant invention to provide a lifting apparatus wherein engagement of the apparatus occurs along the top edge of the wall and the wall itself is tipped or pivoted up upon its lower or footing edge.

In conjunction with the above object, it is also an important object of the instant invention to provide lifting apparatus which can be initially positioned so as to project perpendicularly above the horizontally orientated wall directly at its top edge with the initial lifting force being perpendicular to this top edge and substantially coaxial with the vertically orientated gin pole, thereby enabling the exertion of the maximum amount of lift force to initially start the wall upwardly, while at the same time avoiding the necessity for any counterweight means on the gin pole itself and the elimination of any tendency for the wall to slide forwardly such as would occur were an inclined boom utilized.

In addition, it is a significant object of the instant invention to incorporate various means whereby the lifting apparatus can be quickly adapted for raising walls of greater than normal height, this being done either by the provision of an extensible unit on the gin pole itself or by vertically adjusting the lift column portion of the spreader unit.

Also, it is an object of the instant invention to provide means which will effect a bracing and stabilization of the gin pole during the operation thereof, in conjunction with means for effecting a final vertical positioning of the raised wall.

Further, it is an object of the instant invention to provide a lifting apparatus which can be quickly erected and dismantled and which, when dismantled, is so compact as to enable highway transportation thereof, this allowing the movement of the entire apparatus quickly from one job site to another.

Also, it is a significant object of the instant invention to incorporate means for conveniently raising the gin pole to its initial lifting position.

With regard to the spreader or weight distribution unit, it is highly significant that this unit is made up of a plurality of individual relatively lightweight sections capable of being rigidly locked both to each other and to the top edge of the wall along the full length thereof with this unit incorporating tension members capable of directing the lifting force introduced at the center thereof outwardly, at an angle, to spaced points along the full length of the top edge of the wall.

In conjunction with the above object, it is also a significant object of the instant invention to vary the number and size of sections comprising a particular spreader unit in accordance with the length and weight of the wall to be lifted. Along these same lines, the spreader unit can be so assembled as to enable the utilization of two or more gin poles as might be necessary when erecting extremely long or heavy walls.

With regard to the simultaneous use of two or more gin poles, it is also an object of the instant invention to provide for power lift means, on each gin pole, which can be controlled from a single power source both equally and simultaneously so as to insure the introduction of an equal lift force through all of the gin poles, thereby resulting in a retention of the planar orientation of the wall as it is raised. It will of course be appreciated that an initial centering of the gin poles, with regard to the distribution of weight in the wall, will be necessary, however this involves only a mathematical problem which can be easily worked out.

Basically, the lifting apparatus of the instant invention is but a part of an over-all construction system derived specifically, after much experimentation, for the purpose of providing low cost permanent structures. The desire for permanence in the structures naturally resulted in the use of masonry and concrete which in turn led to the invention of particular wall constructions, and methods and apparatus for preforming the walls in a rapid and inexpensive manner, all of which is to be set forth in subsequent applications. The preforming of the walls, this of course being done on a horizontal forming bed, give rise to a significant problem of how these walls could be most expeditiously raised or tilted up into position. In solving this problem, the lifting apparatus of the instant invention was devised, this apparatus, while extremely compact and capable of being used within extremely limited spaces, such as would be required when erecting within built-up areas which do not provide sufficient room for conventional cranes or boom mounting devices, is capable of efficiently and safely lifting enormous loads.

Primarily, the lifting apparatus of the instant invention consists of a weight distributing or load spreading unit and a lifting unit. The spreader unit is to be made of a plurality of releasably interlockable enlarged frame panels, the number and size of panels or sections utilized depending upon the length of the wall to be raised. The sections are both rigidly bolted to each other so as to form an elongated unit, and are also bolted directly to the top edge of the wall with the lower edges of the spreader sections being aligned with the bottom face of the wall in its horizontal position, the sections being of a height so as to project a substantial distance above the top face of the wall, thereby providing a considerable degree of rigidity and stability to the wall. Each of the sections or panels include a plurality of diagonally extending tension braces which, in conjunction with tensionable rods which can also be provided between adjacent sections and between the outermost sections on each end and any small portion of the wall which might project therebeyond, insure a transfer of the central lift load throughout the full length of the top edge of the wall. In order to releasably engage the lifting unit with the spreader unit, a vertically elongated lift column is rigidly engaged between adjacent spreader sections at a point corresponding to approximately the balance point or center of the weight distribution of the wall. This lift column is to be engaged, at the lower end thereof, by a pulley and cable system which is in turn mounted on a vertically projecting gin pole located just outward of the top edge of the wall in its horizontal position. This gin or gin pole constitutes the lifting unit and is initially positioned so as to enable the exertion of a maximum pull on the wall in initially beginning the tilt up operation, this pull, through the vertical orientation of the gin pole, resulting in a transfer of the counteracting force vertically through the gin and to the ground, thereby eliminating any necessity for counterweight means. Further, the gin pole, along with the various brace means provided therefor, is pivotally mounted at its lower end so as to enable a forward tipping of the gin pole as the wall is tipped up to the vertical, this enabling the continuous exertion of a substantially straight line pull on the wall throughout a major portion of the lifting operation which in turn tends to balance the pole itself. The pole is further stabilized by engagement with the top edge of the wall during the raising operation, or through the use of a specifically devised hold-back member. The actual power is to be applied to the pulley and cable system through a winch preferably driven by a conventional compact hydraulic motor, the use of such a motor enabling the starting of the winch under a full load and also enables the location of the pump and fluid reservoir away from the actual lift area through the utilization of elongated pressure hoses.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 14:
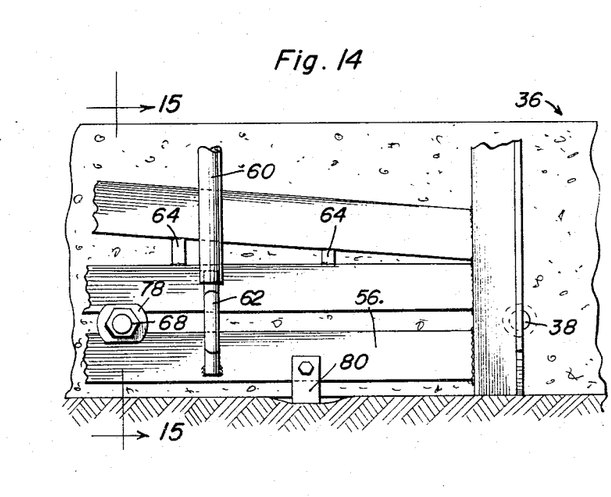
FIGURE 14 is an enlarged partial elevational view detailing the manner in which the spreader unit is to be fixed to the top edge of the wall.
Figure 15:
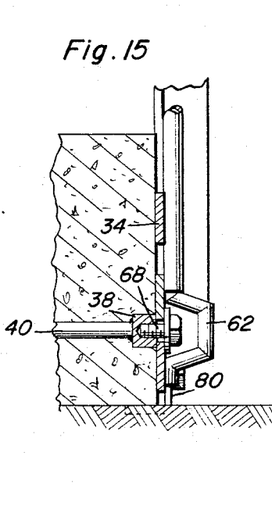
FIGURE 15 is a cross-sectional view taken substantially on a plane passing along line 15—15 in FIGURE 14.

Referring now more specifically to the drawings, attention is initially directed toward the spreader unit 30. This unit 30, consisting of a plurality of releasably interconnected sections 32, is to be removably secured to one edge 34, hereinafter referred to as the top edge, of the wall 36 in its initial horizontal position, the wall in most instances being directly formed on the ground right at the job site. The actual engagement of the spreader or weight distributing unit 30 with the top edge 34 of the wall 36 is effected utilizing internally threaded sockets or nuts 38 embedded within the wall 36 and opening through the top edge 34 thereof as best shown in FIGURES 14 and 15. These sockets 38 are welded directly to the internal reinforcing rods 40 within the wall 36, thereby permanently fixing their location.

Each of the sections 32 of the unit 30 consists basically of a rectangular frame including vertical side members 42 and horizontal top and bottom members 44 and 46. The side and top members 42 and 44 are in the form of elongated angle bars each having a first leg 48, 50 thereof orientated in the general vertical plane of the section or panel 32, and the other leg 52, 54 projecting perpendicularly outwardly or rearwardly. The lower member 46 is in the form of a pair of elongated rigid flat bars or straps 56 orientated in spaced parallel relation to each other and fixed, at the opposite ends thereof, to the lower ends of the side member legs 48.

Figures 1, 2:
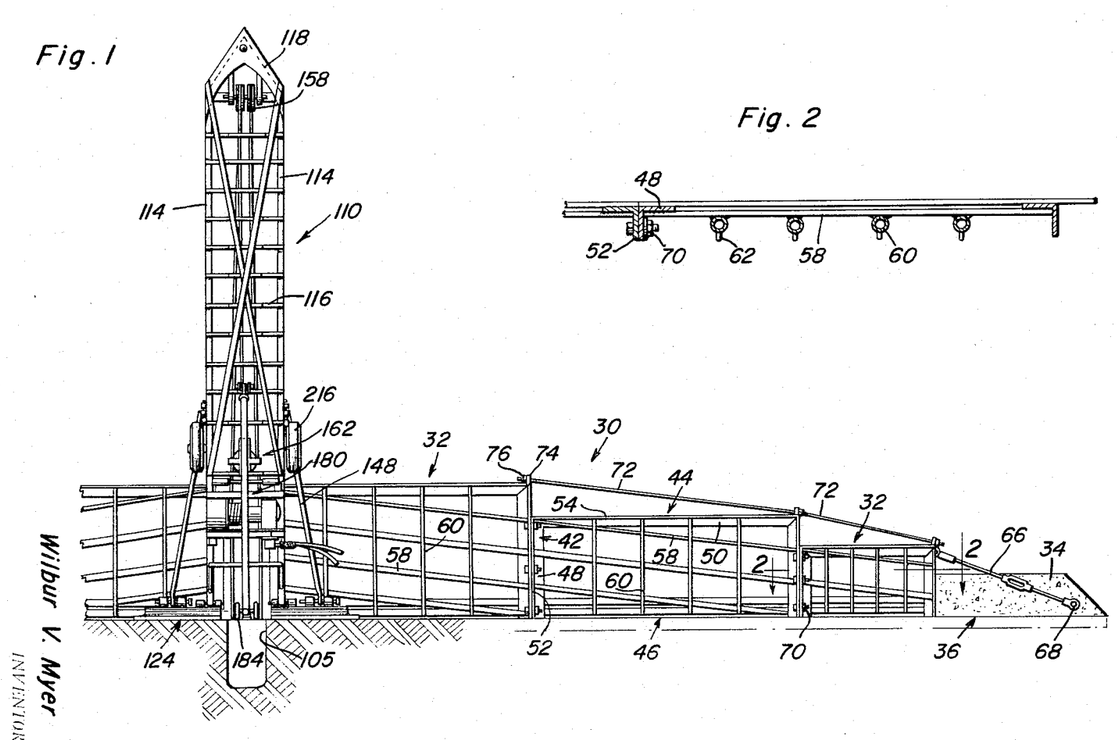
FIGURE 1 is a partial elevational view of the lifting apparatus of the instant invention.
FIGURE 2 is an enlarged partial cross-sectional view through a portion of the spreader unit.

In order to stiffen the above described rectangular frame, diagonal tension accommodating braces or straps 58 are provided at an angle generally between the side members 42, this angle of the straps 58 generally orientating the straps so as to correspond with the lines of force which will develop upon a raising of the wall 36 in a manner which shall be described subsequently. In addition, vertical braces 60 are provided at spaced points along each section 32 between the top member 44 and the uppermost bar 56 of the bottom member 46, these vertical braces 60 being preferably in the form of hollow pipe sections as shown in FIGURE 2. In this manner, a maximum degree of rigidity can be achieved for the amount of weight involved. Referring specifically to FIGURES 14 and 15, it will be noted that the two bottom member straps 56 are also rigidly braced relative to each other by outwardly deformed or arched rods 62 which may be either separate elements or integral continuations of the vertical braces 60. Various other blocking or reinforcing members 64 may be provided as needed, it of course being appreciated that all of the above described elements which go into making up each of the sections 32 are rigidly welded to each other so as to form a unitary relatively lightweight rigid panel.

The sections 32, while all rectangular in shape, are to normally be provided in both varying heights and varying lengths and arranged in decreasing heights outwardly in both directions from the weight center of the wall 36. In other words, a pair of the tallest sections 32 deemed necessary for stabilizing a particular wall 36 are located at the center of the top edge 34 thereof with additional progressively shorter sections being added thereto in both directions. With reference specifically to FIGURE 1, it will be noted that the diagonal tension resisting braces 58 are to be orientated so as to generally form a continuation of the similar braces in the next higher and next lower sections 32. In this manner, a more or less continuous bracing is provided generally along the lines of force which will result from a central raising of the wall 36. Further, it is contemplated that, normally, equal length sections 32 will be used except for the end sections wherein, as illustrated in FIGURE 1, the use of a section of less length may be necessary. Further, also as illustrated in FIGURE 1, inasmuch as it would obviously not be practical to provide sections which are multiples of every conceivable wall length, in the event that the end section 32 on either end of the wall does not correspond exactly with the end of the wall, an elongated tensionable member 66 may be provided and engaged between the outer end of the last section 32 adjacent the upper end thereof, and an anchor bolt 68 threaded within the outermost socket 38. This tension member 66 will most likely consist of an elongated steel rod selectively tensionable by conventional turnbuckle means.

The actual rigid interlocking of the sections or panels 32 in longitudinal alignment with each other is accomplished by utilizing bolts and nuts 70 engaged through aligned holes 71 in the rearwardly projecting legs 52 of the side members 42, these bolt holes 71 being so orientated as to align with corresponding bolt holes in adjacent side members regardless of the particular height of the adjacent section 32. Further, as will be appreciated, these nutted bolts 70 are provided throughout the full height of the shortest side member so as to effect a rigid clamping of the sections 32 to each other, the outer faces of these side member legs 52 of course being planar so as to enable a flat or flush engagement therebetween. Additional tension accommodating steel rods 72 are to be provided, as desired, between the outermost upper corner of each of the sections 32, thereby further stabilizing the spreader unit 30 by acting in the manner of suspension rods for the outermost sections 32. These steel rods 72 are received through upwardly projecting ears or sleeves 74 rigid with the corresponding corners of the sections 32, suitable tensioning nuts 76 being utilized so as to introduce the desired tension into the steel rods 72.

The actual engagement of the sections 32 of the spreader unit with the top edge 34 of the wall 36 is effected through the headed bolts 68 projecting through the elongated slot provided between the adjacent bottom member bars 56 and threaded into the outwardly opening wall embedded sockets 38 as best seen in FIGURES 14 and 15. The heads of the bolts 68 bear, through enlarged washers 78, against the faces of the bars or straps 56 and span the slot or space therebetween. The arched portion in each of the braced elements or rods 62 is specifically provided so as to not interfere with the bolts 68 should one or more of these rods 62 overlie a socket 38, or should it become necessary to effect a longitudinal adjustment of the sections 32, this being done by merely loosening the bolts 68 and sliding the sections along the wall 36. Further, if so desired, L-shaped extensions 80 can be bolted to the lower bar or strap 56 in a manner so as to project therebelow and engage beneath the bottom face of the wall 36, thereby further engaging the spreader unit 30 with the wall 36 especially during the initial movement of the wall 36, this being the period of greatest stress.

Figure 21:
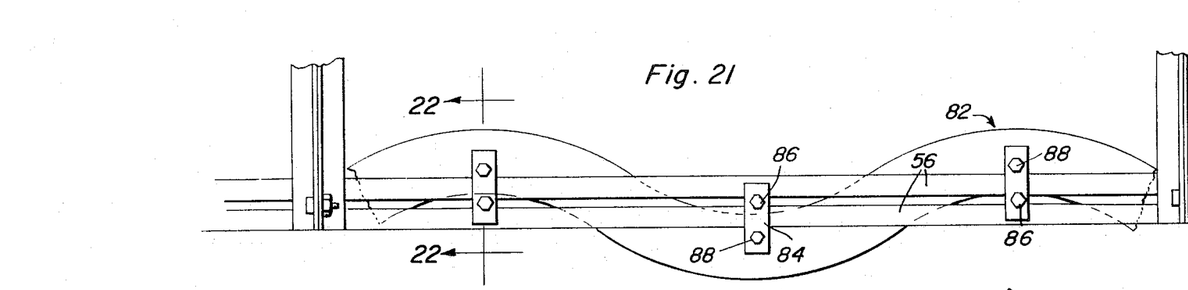
FIGURE 21 is a partial elevational view illustrating the manner in which the spreader unit can be adapted for engagement with undulating or curved walls.
Figures 22, 23, 24:
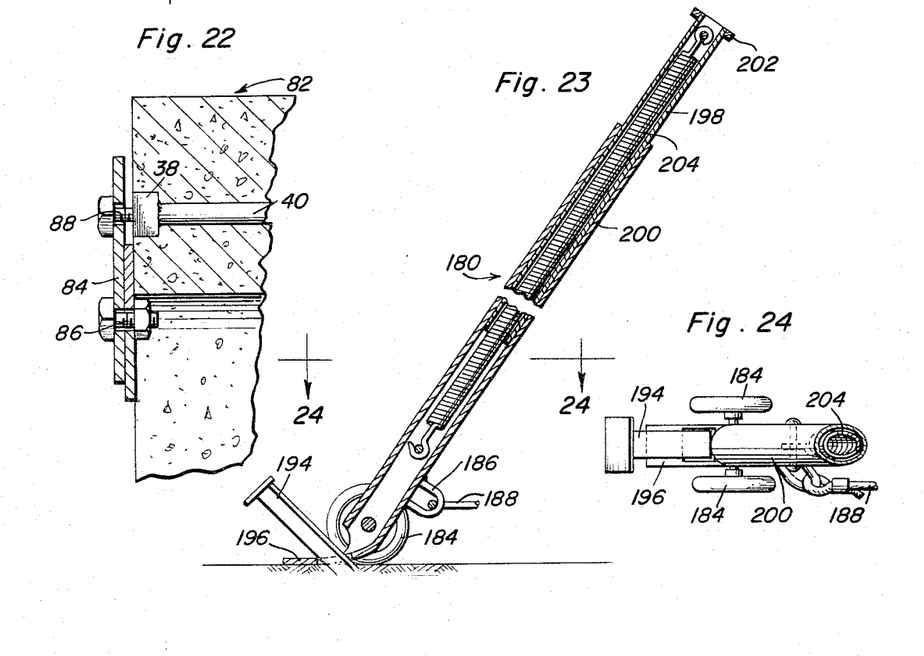
FIGURE 22 is an enlarged detailed sectional view taken substantially on a plane passing along line 22—22 in FIGURE 21.
FIGURE 23 is a longitudinal cross-sectional view through the hold-back member of the lifting unit.
FIGURE 24 is a cross-sectional view taken substantially on a plane passing along line 24—24 in FIGURE 23.

Referring to FIGURES 21 and 22, it will be appreciated that the spreader unit 30 can be easily adapted for use in conjunction with undulating or wavy walls 82, these walls of course similarly being provided with the embedded internally threaded sockets welded to the reinforcing rods 40. This adaptation of the spreader or weight distributing unit 30 is achieved through the use of flat elongated extension plates 84 which are bolted to the sections 32, by a nutted bolt 86 extending through one end of the plate and between the section straps 56, and project either vertically upward therefrom or vertically downward depending upon the particular location of the corresponding socket 38 to which the other end of the adapter or extension plate 84 is bolted by a suitable bolt 88. Incidently, as will be appreciated from the drawings, each of the spreader sections 32 are of a height substantially greater than the thickness of the wall 36, the rigid though lightweight construction of the individual sections 32 allowing them to be easily handled notwithstanding the sizes thereof which, as presently contemplated, will be anywhere from a 4 x 8 foot section to a 2 x 4 foot section.

Figure 9:
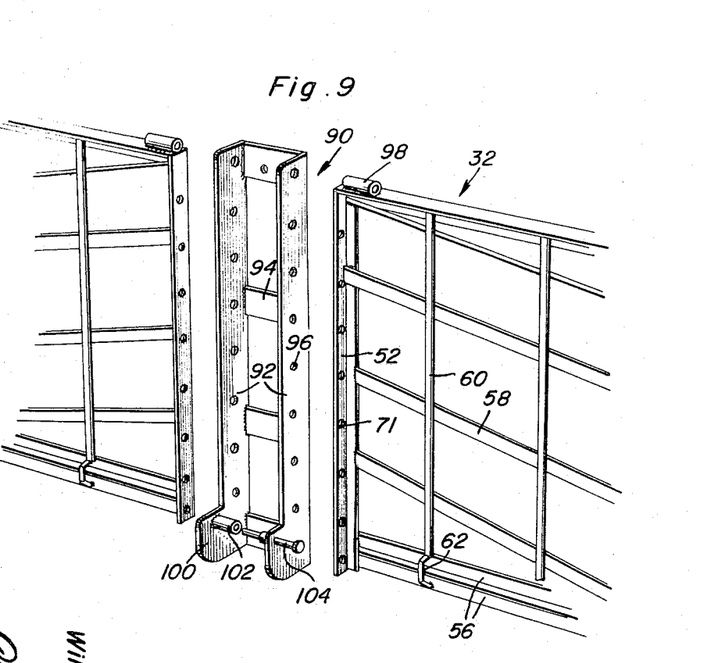
FIGURE 9 is an exploded perspective view of the lift column and portions of the adjacent spreader sections.
Figure 10:
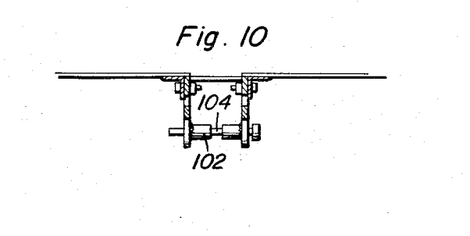
FIGURE 10 is a horizontal cross-sectional view through the lift column adjacent the lower end thereof.

The actual lifting force is introduced to the spreader unit 30 through a centrally located lift column 90. This lift colum 90, located between the innermost ends of the innermost sections 32, consists of a pair of spaced parallel vertical side plates 92 rigidly fixed in spaced relation to each other by a plurality of transversely extending cross braces 94 welded thereto. Each of the lift column side plates 92 includes a vertical series of holes 96 therein orientated for alignment with the holes 71 in the adjacent legs 52 of the section side members 42, suitable bolt means extending through the aligned holes 71 and 96 so as to rigidly lock the adjacent sections 32 to the centrally located lift column 90, this lift column 90 incidently of course being aligned with approximately the weight center of the wall 36. In addition, it will be noted that, referring specifically to FIGURE 9, the upper inner corner in each of the adjacent sections 32 is provided with a cylindrical sleeve 98, these sleeves 98 aligning with a pair of the transversely aligned holes 96 in the side plates 92 of the column 90 receiving, completely therethrough, an elongated tension bolt or rod, thereby locking the upper inner ends of the innermost sections 32 directly to each other, rather than to just the adjoining side plates 92. The lower ends of the side plates 92 of the lift column 90 are both provided with parallel outwardly or rearwardly projecting extensions or wings 100 upon which are mounted inwardly directed cylindrical sleeve portions 102 which in turn selectively receive an elongated lifting pin 104 therethrough. Incidently, as will be appreciated from FIGURES 12 and 13, the vertical orientation of the lift column 90 can be varied, depending upon the particular situation, by merely providing for a hole 105 in the ground therebelow so as to allow for a reception of the lower end of the lift column 90, the lift column 90 of course still being bolted to the adjoining sections 32 through the aligned apertures 71 and 96 over the portion of the side plates 92 which still overlap the legs 52 of the adjacent sections 32. The necessity for varying the vertical orientation of the lift column 90 would arise when, for example, accommodating higher than normal walls such as will be apparent by the end of the specification.

Figure 20:
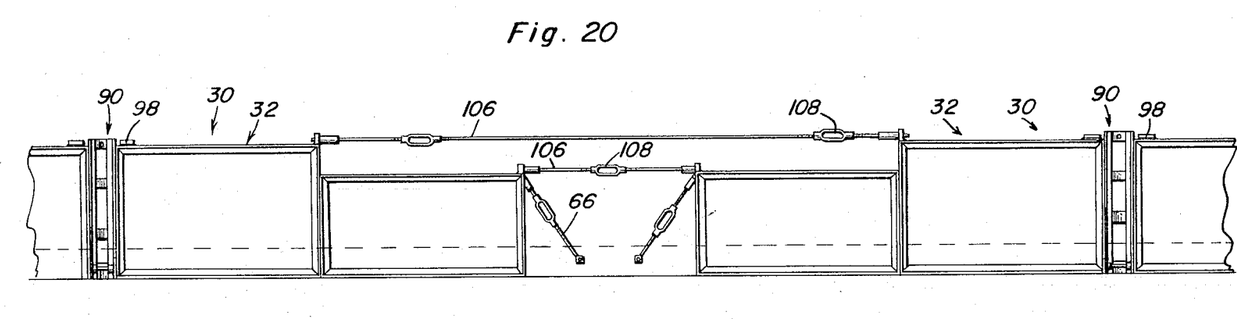
FIGURE 20 is a schematic view illustrating one arrangement of the spreader sections when the use of more than one gin pole is contemplated.

Attention is now specifically directed toward FIGURE 20 wherein a tandem arrangement of spreader units 30 is diagrammatically illustrated for the purpose of exemplifying one arrangement whereby two or more lifting points can be provided so as to accommodate excessively long walls. Under these circumstances it will of course be appreciated that the lift columns 90, regardless of the number of such columns that are to be utilized, are located so as to equally distribute the weight therebetween. Each of these columns 90 of course has a series of spreader sections 32 associated therewith in the manner described in detail supra. Further, it is contemplated that each of the spreader units 32 also be tied directly to each other by elongated tension members 106 extending horizontally between corresponding points on the adjacent spreader units 30, suitable tensioning means, for example turn-buckles 108 of course being provided. In addition, tension members corresponding to the above described tension members 66 can also be provided where needed.

Figures 4, 11, 25:
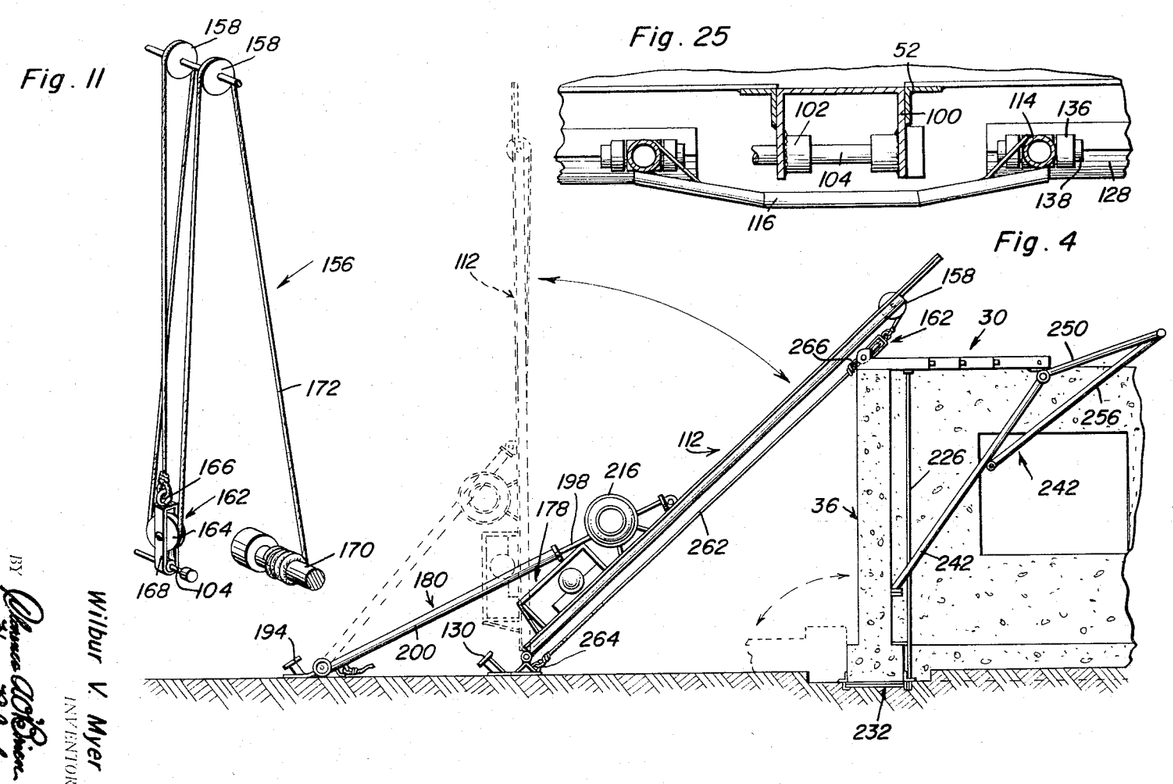
FIGURE 4 is a side elevational view of the apparatus illustrating steps in the raising of the wall.
FIGURE 11 is a schematic perspective view of the pulley and cable arrangement.
FIGURE 25 is a horizontal cross-sectional view taken substantially on a plane passing along line 25—25 in FIGURE 3 illustrating the manner in which the lift pin is straddled.
Figures 6, 8:
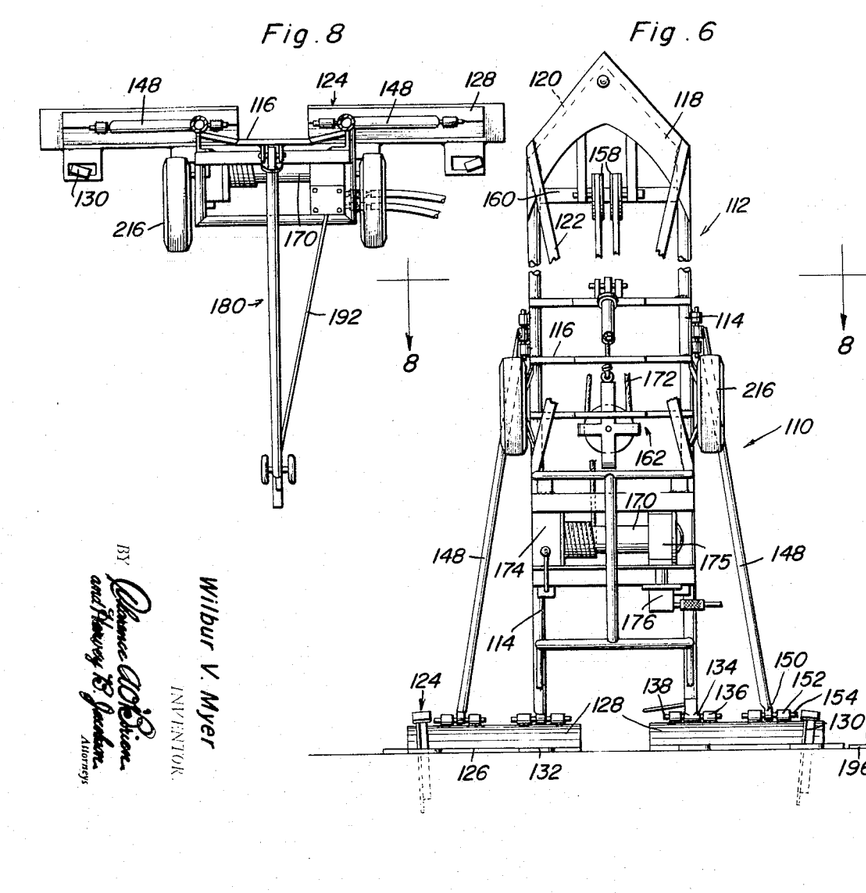
FIGURE 6 is an enlarged elevational view of the lifting unit.
FIGURE 8 is a horizontal cross-sectional view taken substantially on the plane passing along line 8—8 in FIGURE 6.
Figure 7:
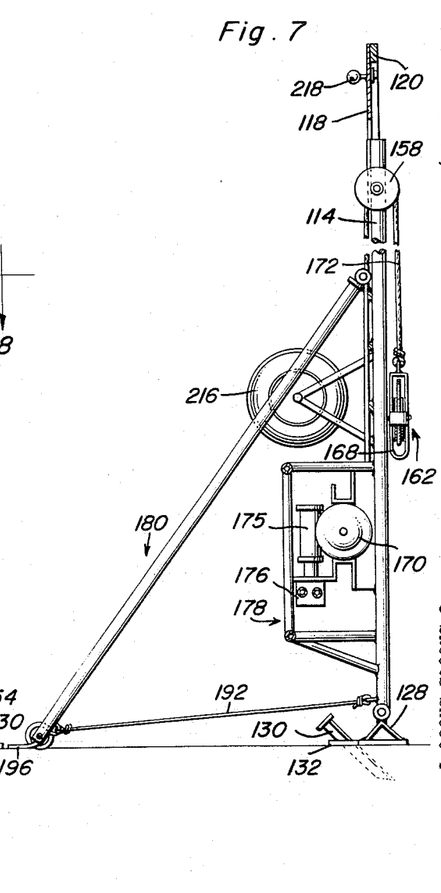
FIGURE 7 is a side elevational view of the unit shown in FIGURE 6.

The actual lifting of the wall 34 through the spreader unit 30 is effected by means of a lifting unit 110. The lifting unit 110 comprises basically an elongated gin or gin pole 112 which in turn consists of a pair of laterally spaced elongated side columns or legs 114 rigidly interlocked by horizontal cross bracing 116 secured to the rear of the legs 114 and having the intermediate portions thereof bowed rearwardly of the vertical plane of the legs 114, as best seen in FIGURE 25. The upper ends of the side columns or legs 114 are rigidly interlocked by an enlarged generally triangular rigid plate 118 welded to the upper ends of both columns 114 and projecting thereabove, this plate 118, as well as the upper ends of the columns 114 being further rigidified by a pair of upwardly converging flat rigid straps 120 welded thereto. Finally, diagonally extending rigid cross braces 122 can be provided as desired, these braces 122 also being rearwardly bowed out of the plane of the legs 114. As will be appreciated, the gin pole 112, constructed in this manner, will be of a highly strong and rigid nature, while at the same time being of relatively lightweight and substantially planar so as to enable its orientation within extremely confined areas directly against the top edge 34 of the wall 36.

The pin pole 112 is to be supported upon a relatively narrow elongated base 124. The base 124 includes an elongated rigid foot or base plate 126 engageable directly on the ground surface, and an elongated inverted angle member 128 orientated with the angle thereof positioned uppermost and with the free edges of the legs welded to the base plate 126 along the length thereof. It will be noted that the base 124 consists of a pair of spaced longitudinally aligned sections, this being done so as to accommodate the lift pin 104 directly between the legs 114, as well as to allow a vertical varying of the position of the lift column 90 below the ground level as suggested in FIGURE 13. However, it will of course be appreciated that at least the base plate 126 can be made continuous if desired. The base 124, which projects a substantial distance laterally beyond both side columns or legs 114, is anchored to the ground by a plurality of elongated driven spikes 130 extending through rearwardly projecting apertured lugs 132 which in turn are integral with the base plate 126, these ground engaging spikes or anchors 130 being inserted at approximately a 45° angle so as to provide a maximum resistance to movement as the gin pole 112 approaches its final position, note FIGURE 4.

The actual engagement of the gin pole 112 with the base 124 is to be in the form of a releasable hinging or pivotal engagement. In order to achieve this, the lower end of each of the side columns 114 is provided with a transversely orientated cylindrical sleeve 134 which is positionable between a pair of similar spaced cylindrical sleeves 136 welded to the apex edge of the angle member or members 128, an elongated pin 138 extending through the aligned sleeves and allowing for a relative rotation therebetween, suitable means of course being provided so as to releasably lock the pin 138 within the aligned sleeves 134 and 136.

Figures 16, 17, 18, 19:
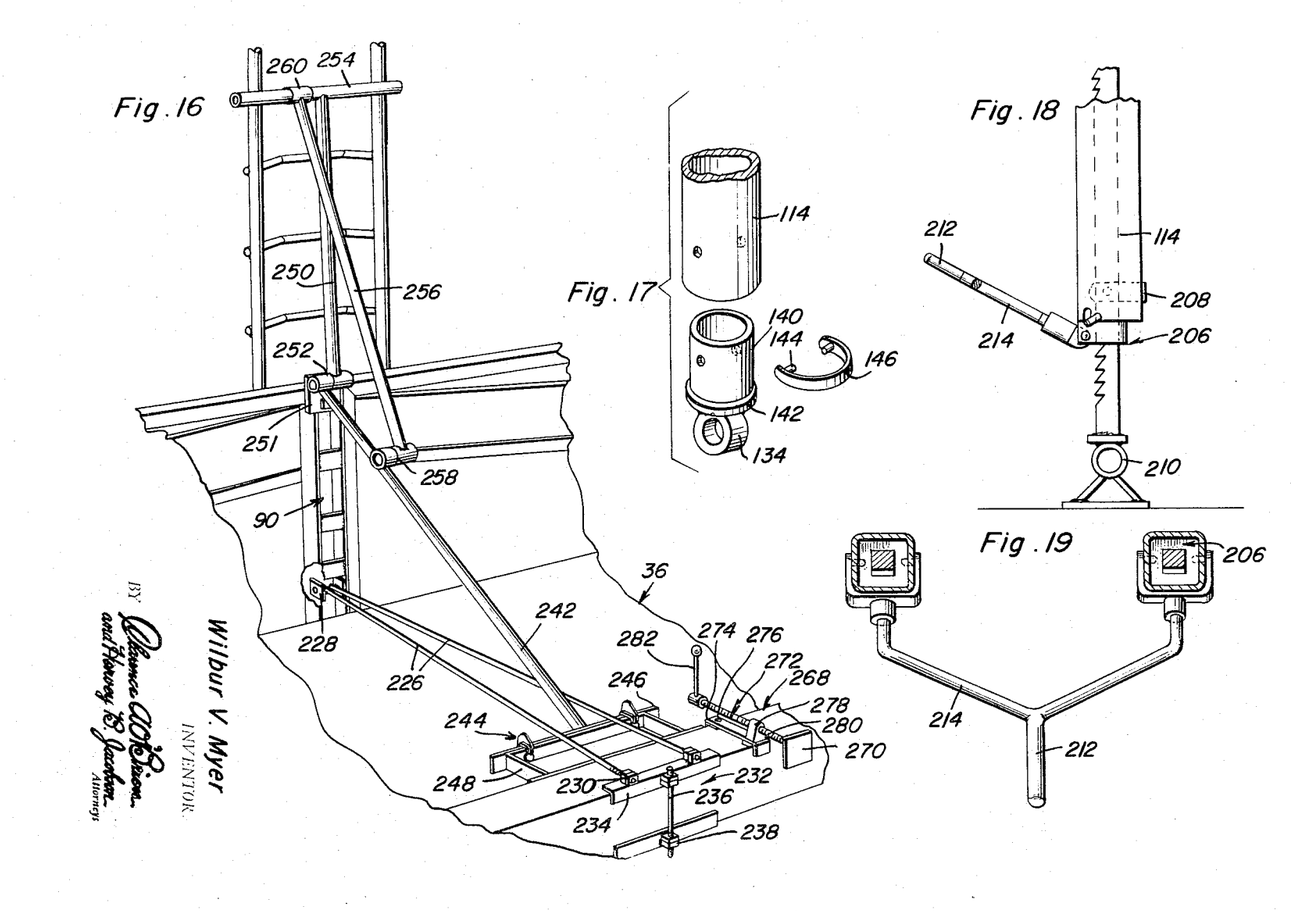
FIGURE 16 is a partial perspective view illustrating various details of the gin pole bracing means and means for facilitating a final positioning of the vertically orientated wall.
FIGURE 17 is an exploded perspective view illustrating one manner of providing for the pivotal engagement of the gin pole legs with the ground engaging base.
FIGURE 18 illustrates one manner of providing for the elongation of the gin pole so as to accommodate walls of greater than normal height.
FIGURE 19 is a horizontal cross-sectional view through the structure of FIGURE 18 illustrating the dual handle for effecting a simultaneous elevation of both legs of the gin pole.

With reference to FIGURE 17, it will be noted that the transversely extending column sleeve 134 can be, rather than welded directly to the lower end of the corresponding side column 114, fixed to a cylindrical stub 140 which in turn is telescoped within the lower end of the corresponding column 114 and locked into position both by an annular abutment collar 142 and by opposed locking pins 144 mounted on opposite ends of an arcuate resilient spring 146.

The lateral stability of the gin pole 112 is enhanced by a pair of outwardly and downwardly inclined removable side braces or outriggers 148, these outriggers 148 having their upper ends pinned to the side columns 114 at a point along the length thereof and a substantial distance above the base 124. The lower ends of these outriggers 148 are similarly pinned and include transversely directed horizontally orientated cylindrical sleeves 150 rotatably engaged between a pair of spaced cylindrical sleeves 152, secured to the apex edge of the angular member or members 128, by means of an elongated hinge pin 154, all in substantially the same manner as the hinge engagement of the lower ends of the side columns 114 and in longitudinal outwardly spaced alignment therewith, thereby allowing a pivotal movement of these outriggers 148 in conjunction with the gin pole 112 so as to maintain the lateral stability thereof throughout the full length of movement.

The gin pole 112 is engaged with the spreader unit lift column, and the tilt up movement of the wall 36 is achieved through a pulley and cable system 156. This system 156 basically includes a pair of crown pulleys 158 rotatably and removably mounted in laterally spaced relation to each other on the gin pole 112 between the side columns and immediately below the upper end thereof, the pulleys 158 being centrally located by horizontally and vertically extending rigid mounting straps 160 welded to the side columns 114 and the upper bracing plate 118. In addition, the system 156 includes a centrally located lower block 162 orientated perpendicular to the planes of the pulleys 158 and parallel to the plane of the gin pole 112 itself. This block 162 includes, in addition to the pulley 164, an upwardly projecting eye or hook 166 and depending side plates 168 forming a seat below the sheave or pulley 164 for the reception of the lift pin 104 for releasably engaging the block 162 with the lift column 90 of the spreader unit 30. A centrally located transversely extending winch cable drum 170 is also of course provided with the cable 172 being fixed to the drum 170 winding thereon and extending first over one of the upper pulleys 158, then about the block pulley 164, then over the second upper pulley 158, and finally to the securing ring 166 on the block 162. While this specific arrangement has been found particularly efficient, it will of course be appreciated that it is intended the instant invention also encompass equivalent pulley and cable arrangements. The winch drum 170, having a suitable handle controlled throwout clutch means 174 thereon, is to be preferably driven by a conventional compact hydraulic motor 176 through a worm gear drive or gear reducer 175. This use of a hydraulic motor is deemed particularly significant for several reasons, including its lightweight compact nature, of significance in a portable unit as contemplated by the instant invention, its ability to start under a full load, and being able to, through elongated pressure hoses, keep the actual power source, that is the pump and fluid reservoir, safely out of the actual working area and, if so desired, separately and compactly mounted on its own trailer. Also of prime significance is the fact that all workmen and operators are at all times safely back from the wall during the raising operation. In order to protect the winch drum 170 and motor 176, both of course being mounted directly on the rear face of the gin pole 112, a protective tubular framework 178 is welded to the gin pole 112 and encloses both the winch drum 170 and motor 176, this protective framework 178 of course being sufficiently open so as to enable easy access to the winch and motor themselves.

The provision of a pair of spaced legs 114 on the gin pole 112 is deemed particularly significant in that it enables a straddling of the lift pin 104 with the lift pin 104 being orientated exactly on the longitudinal centerline of the gin pole 112. In this manner the gin pole 112 will be substantially balanced in a vertical position over the lift pin 104 and will maintain itself upright as an initial load is introduced into the cable 172. As the load is increased and the wall 36 starts to tilt up, the gin pole 112 will lean forward and the coplanar relationship of the lift pin 104 and gin pole 112 will be maintained through a substantial portion of the lift, thus retaining the balanced condition of the gin pole 112 relative to the load. This has been schematically illustrated in FIGURE 26. The rearward bowing of the cross bracing 116 is of significance in allowing the pin 104 to move longitudinally between the legs 114 during the raising operation.

Figures 3, 5, 26:
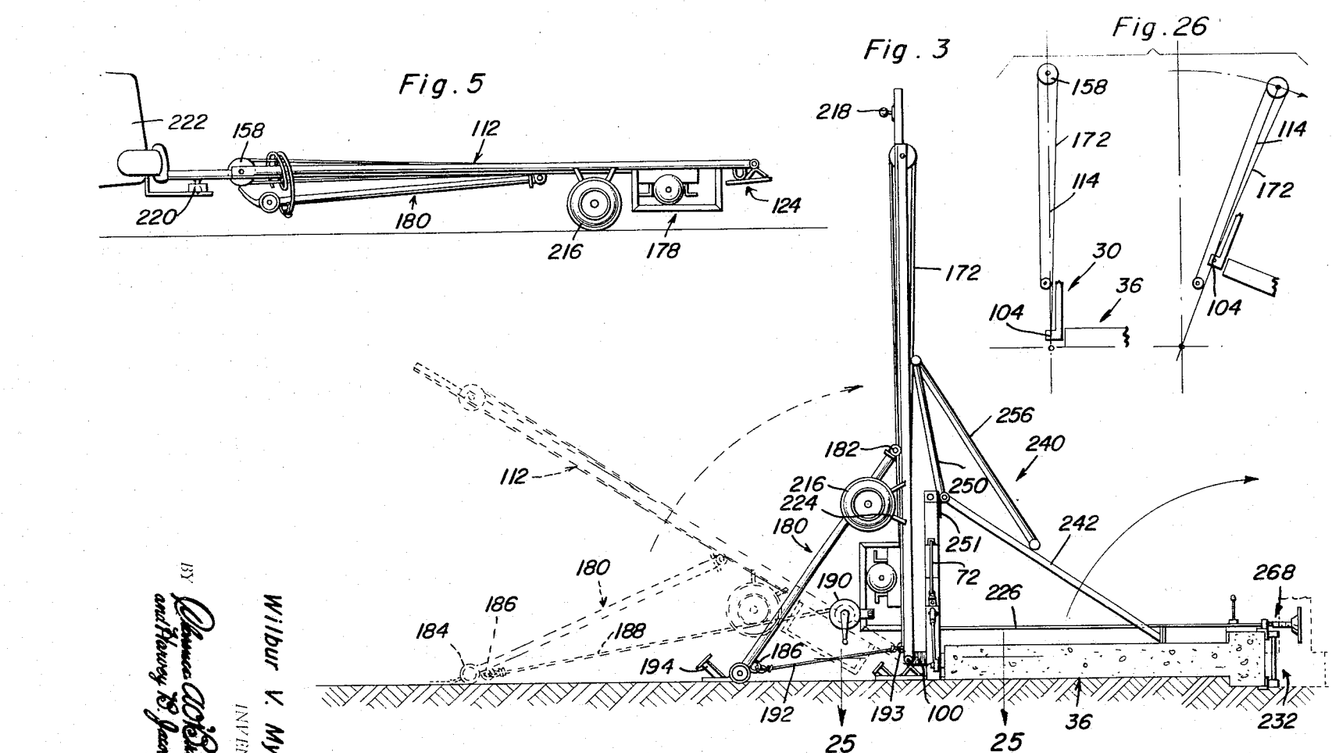
FIGURE 3 is a side elevational view of the apparatus, also, illustrating in phantom lines, a step in the erection of the lifting unit.
FIGURE 5 is a view of the collapsed lifting unit mounted for road travel.
FIGURE 26 is a schematic illustration of the orientation of the gin pole in the same plane as the lift pin both at the beginning of the lift and during the initial stages thereof.

While, due to the relatively compact and lightweight nature of the gin pole 112 it is possible to manually orientate it for the tilt up operation, it is contemplated that, in the preferred embodiment, this be done through the use of a rearwardly extending member 180, this member 180, during the actual tilt up operation, performing a highly significant function as a hold-back leg or member as shall be described presently. This member 180 is releasably and hingedly engaged, at a first end 182, with an intermediate portion of the gin pole 112 and normally lies, upon a collapsing or horizontal positioning of the gin pole 112, parallel to the gin pole and outwardly toward the upper end thereof as will be appreciated from FIGURE 5 and the phantom lines in FIGURE 3. With continuing reference to FIGURE 3, it will be noted that the outer or lower end of the member or leg 180 is provided with a pair of small rotatably mounted wheels 184, this also being clearly shown in FIGURES 23 and 24. Inwardly of the wheels 184 is a ring or U-shaped member 186 to which an elongated cable 188 is to be engaged, the other end of this cable 188 being wound upon a manual winch 190 mounted temporarily on the gin pole 112, for example on the framework 178. It is through this winch 190 and cable 188 that the lower wheel supported end of the member 180 is drawn forwardly so as to produce a simultaneous raising of the gin pole 112 in an obvious manner. After the gin pole 112 has been vertically orientated, a tie member or cable 192 is engaged between the member ring 186 and a similar ring 193 on the lower end of the gin pole 112 or on the base 124, thereby fixing the position of the member 180 so as to act in the manner of a brace preventing a rear pivoting of the gin pole 112. At this point, the cable 188 and winch 190 can be removed if so desired. Further anchoring of the lower end of the member 180, against movement in any direction, is provided by an elongated anchoring spike 194 driven into the ground at a 45° angle through a rearwardly projecting integral apertured lug or plate 196 on the lower end of the member 180, this plate 196 of course being so located as to not interfere with the initial rolling contact of the wheels 184 with the ground surface during the raising operation. Incidently, it should also be appreciated that, if so desired, the cable 172 of the system 156 can be rewound so as to enable a utilization of the system 156 in raising the gin pole 112 through the member 180. However, such an arrangement would not normally be used both because of the time delay which would be involved and because of the ease with which the gin pole 112 can be raised utilizing a simple hand winch 190.

In order to utilize the member 180 as a hold-back member for the gin pole 112 during the tilt up operation, so as to both stabilize the gin pole 112 and prevent a riding of the gin pole 112 directly on the upper edge of the wall 36 during the raising operation, the member 180 is constructed of two elongated telescoping sections 198 and 200, the upper member 198 telescoping within the lower member 200, this upper member 198 of course being pivotally engaged with the gin pole 112 and including a circular stop collar 202 about the upper end thereof so as to limit the telescoping movement thereof into the lower member 200, thereby providing a rigid brace against backward movement of the gin pole 112. The actual holding back of the gin pole 112 is effected through a controlled outward movement of the upper section 198 relative to the lower section 200 by means of an elongated coiled tension spring 204 having a first end thereof secured adjacent the uppermost end of the section 198 and the other end thereof secured adjacent the lowermost end of the section 200. It is of course contemplated that this spring 204 possess sufficient strength so as to actually maintain the gin pole slightly above or rearwardly of the top edge of the wall 36 during the tilt up operation. With regard to the specifically described hold-back member, while such is in fact a preferred embodiment of holdback member, it will be appreciated that various other means can be used, including block and tackle means if so desired. Further, inasmuch as the gin pole 112 is capable of itself being positioned, through the extremely thin nature thereof, within limited spaces and still effectively tip up a wall, it is also possible that no rearwardly extending hold-back member or brace will be utilized, the gin pole 112 merely balancing itself or resting against the upper edge 34 of the wall 36 as the wall 36 is raised, this in no way inhibiting the raising of the wall due to the relatively small area of contact between the wall 36, and more precisely the spreader unit 30, and the gin pole 112.

As will be appreciated, the maximum heigh wall 36 which can be tilted up into position bears a direct relationship to the height of the gin pole 112. However, the instant invention contemplates being able to vary the effective length of the gin pole by vertically lowering the lift column 90 relative to the remainder of the spreader unit 30 as detailed supra in conjunction with FIGURE 13, and by physically lengthening the side columns or legs 114 of the gin pole 112 itself. This lengthening of the side columns 114 is achieved, in one embodiment, through manual jacking units 206 telescoped within the open lower ends of the columns 114 and releasably retained therein in a suitable manner, such as for example by a spring and pin unit 208, similar to the device shown in FIGURE 17. This jacking unit 206, having its lower end provided with a sleeve 210 for hinged engagement with the base 124 as described supra in conjunction with the gin pole sleeves 134, is to include a conventional ratchet mechanism as found in automobile jacks, thereby enabling an elevation of the corresponding column 114 in an obvious manner. Further, inasmuch as both columns 114 are to be simultaneously elevated, a single handle 212 is provided, this handle, through rigid oppositely directed portions 214, engaging and controlling the jacking unit 206 associated with each column 114. Incidently, it will also of course be appreciated that simultaneous actuatable hydraulic jacking units can also be provided rather than the mechanical units 206 if so desired.

As noted supra, one of the significant objects of the instant invention is its ability to be easily and quickly transported from one location to another. Accordingly, the gin pole 112 is provided with a pair of travelling wheels 216, each independently mounted in laterally aligned positions on the side columns 114 and projecting rearwardly therefrom beyond the rear plane of the protective framework 178 for engagement with the road surface as illustrated in FIGURE 5. In addition, a suitable hitch unit 218 is provided on the upper end of the gin pole 112 for engagement with a complementing unit 220 on any suitable towing vehicle 222. The actual mounting of each of the wheels 216 can consist of simply a transversely extending stub axle fixed rearwardly of the gin pole 112 by a pair of converging rigid arms 224.

Referring now particularly to FIGURES 3, 4 and 16, it will be noted that a pair of elongated tensionable rods 226 are provided over the top face of the wall 36 between the lift column 90 and the bottom or footing edge of the wall 36. Each of the rods 226 is provided with an enlarged flat plate 228 welded to the upper end thereof, this plate 228 being in turn releasably bolted to one of the lift column legs 92 through one of the bolt holes 96 therein. The opposite end of each of the tension rods 226 is externally threaded and tensioned, through an adjusting nut 230 to a wall clamping unit 232. This unit 232 includes a pair of enlongated angle members 234 engaged with the upper and lower corners of the bottom edge of the wall 36 and an elongated end-threaded rod 236 having either one or two adjusting nuts 238 thereon for drawing the angle members 234 toward each other in clamping relation to the bottom edge of the wall 36. In this manner a further clamping of the spreader unit to the top edge 34 of the wall 36 is achieved, and an additional degree of stability is introduced at the point of the lifting force.

With continuing reference to FIGURES 3, 4 and 16, it will be noted that an enlarged bracing unit 240 has been provided, this bracing unit 240 acting so as to assist in stabilizing the gin pole 112 in its initial vertical position. The brace unit 240 includes an elongated tubular member 242 extendng diagonally from engagement with the top ledge of the footing portion of the wall 36, through a bearing portion 244, into bolted engagement with the upper end of the lift column 90. This bolted engagement is achieved by means of at least one bolt extending through a plate 251 fixed to a sleeve 252 welded to the upper end of the member 242 and through the uppermost brace 94 on the lift column 90. With regard to the bearing portion 244 it is contemplated that an elongated plate 246 be provided in conjunction with variable size spacers 248 if or as needed so as to accommodate the bracing unit 240 to different height walls.

The brace unit 240 includes, in addition to the elongated member 242, a second elongated tubular member 250 fixed to the upper end of the member 242, through the transverse sleeve 252, and projecting for a substantial distance vertically thereabove and slightly outward of the top edge 34 of the wall 36 where it is rigidly affixed to a transversely extending tubular member 254 which is to bear directly against the front face of the gin pole 112 outward of the vertical plane of the edge 34. In this manner, the gin pole 112 is held off the top edge 34 during the initial part of the tilt up until the holdback leg 180 can come into play. Further, after the first few feet of lift, the pole can slide freely along the edge 34, and in fact should tend to balance itself just off the edge during a substantial portion of the lift due to the straddling of the lift pin 104 by the gin pole legs 114 and the alignment of the pin 104 with the crown pulley shafts. The member 254 also acts as a guide to the exact vertical positioning of the gin pole 112, the gin pole 112 being raised from its transporting position until contact is actually made with the transversely extending member 254 against which it will rest. Finally, an elongated tubular member 256 is engaged, through transversely extending sleeves 258, with the member 242 at an intermediate point therealong, this member 256 extending up into engagement with the transversely extending member 254 through a sleeve 260, thereby additionally stabilizing the position of this member 254. If so desired, in order to enable a collapsing of the bracing unit 240, the sleeve portions 252, 258 and 260 can be formed of telescoping sections so as to enable the unit 240 to be disassembled by moving the member 242 laterally away from the members 250 and 256. Further, the member 256 may be either manually or automatically variable in length so as to adjust the height at which the bracing unit will no longer hold the gin pole off the wall edge 34.

As will be appreciated, as the wall 36 approaches its final vertical position, great care must be taken so as to prevent a forward tipping of the wall beyond the vertical. This can be accomplished in various ways, for example, an elongated hold-back cable 262, as shown in FIGURE 4, can be utilized, this cable having the opposite ends thereof engaged with the base, as at 264, and the lower portion of the lift column 90, as at 266. Also, the instant invention contemplates the use of a screw jack device 268, note FIGURE 16, clamped to the wall footing and extending beyond the lower edge thereof a distance contemplated to engage the foot portion 270 thereof with the ground surface as the wall 36 reaches a substantially balanced position just beyond which the weight of the wall will tend to tilt it forwardly in the direction of the lift. The unit 268 is fixedly clamped to the footing in any suitable manner such as through an enlarged U-shaped clamp 272 having the upper leg 274 vertically adjustable and selectively bolted, as at 276, to the bight portion of the clamp 272, this bight portion including an outwardly directed enlarged lug 278 having an internally threaded aperture therethrough for the threaded reception of an elongated threaded jack shaft 280. This shaft 280, as will be appreciated, is engaged with the enlarged foot plate 270 and has a control handle 282 on the upper end thereof for effecting a controlled withdrawal or upward movement of the foot plate 270 so as to gradually lower the wall 36 into its final vertical position. It is contemplated that as many of these screw jacks 268 be provided as deemed necessary.

The actual tilt up operation, utilizing the above detailed apparatus, involves first locating the center of weight of the horizontally positioned wall. Next, the spreader unit 30 is bolted to the top edge 34 of the wall 36 with the lift column 90 located so as to correspond with the center of weight, the spreader unit 30 being constructed of a plurality of the individual sections 32, the sections 32, outward from the lift column 90, being of progressively less height. Further, adjustable tensioning rods can be extended both between adjacent sections and between the last section and any portion of the wall 36 which might project therebeyond. After the spreader unit 30 is secured to the top edge 34 of the wall 36, the elongated base 124 is positioned just rearward of the spreader unit 30 and parallel thereto, this base 124 being suitably anchored by the driven anchoring spikes 130 angled rearwardly at approximately 45° so as to produce the maximum resistance to disengagement at the point when the raised wall 36 starts to tip into its final vertical position. Next, the rearwardly extending horizontal gin pole is brought up to the base 124 and has the lower ends of both the side columns 114 and outriggers 148 pivotally engaged therewith, the side columns straddling and being centered on the lift pin 104. The gin pole 112 is then vertically raised, preferably by means of drawing the hold-back member 180 forwardly through a conventional hand winch 190. Upon reaching its erected position in vertical alignment with the lift pin 104, the gin pole 112 is stabilized by an anchoring spike 194 engaged, at a 45° angle, with the foot of the hold-back member 180. Additional bracing and stabilizing is provided both by the tensioned steel rods 226 and the forward bracing unit 240. Incidently, with regard to this bracing unit 240, it will be noted that the tensioned rods 226 act so as to properly retain and anchor the enlarged foot end thereof. Further, while the gin pole has been described as being raised forwardly toward the top edge of the wall, under extremely confined conditions, the narrow, and substantially planar gin pole 112 can be raised rearwardly from a first position overlying the horizontally orientated wall itself. In other words, under those circumstances wherein no room is provided for the rearwardly extending hold-back member 180, the entire bracing of the gin pole can be from the forward side thereof, for example through an elongated selectively telescoping pivotally mounted brace extending between the extreme upper end of the gin pole 112 and a point sufficiently forward of the wall 36 so as to not interfere with the actual tilt up thereof. The relatively light weight of the gin pole 112 would enable it, under these circumstances, to be vertically orientated manually, although, even a rearward raising of the gin pole 112 would be possible, utilizing a pivoted leg similar to 180 and a hand winch, prior to an assembly of the spreader unit 30.

After the gin pole 112 has been vertically orientated, the pulley and cable system is engaged with the spreader unit 30 by inserting the lift pin 104 through the depending pin receiving portion of the block 162, the cable 172 extending substantially vertically from the engaged block 162 to the upper or crown pulleys 158, thereby providing for a vertical pull on the wall parallel to the vertically orientated gin pole 112 and coextensive therewith, thereby avoiding any tendency for the gin pole to slip at this critical point, and also eliminating the necessity for counterbalancing means. In actual practice, the lifting operation is stopped after raising the wall approximately one-half inch in order to ascertain whether the wall is coming up straight. After this, the lifting operation continues with the gin pole progressively leaning forward and following the wall itself, the straight line pull on the pin tending to hold the pole just off the top of the wall with the spring loaded hold-back member 180 normally assisting in maintaining the pole just out of contact with the top edge 34 of the wall 36. As the wall 36 approaches the balance point, the lifting operation is slowed and the hold-back cable 262 or jack units 268 utilized in bringing the wall 36 to its final vertical position. Incidently, if so desired, the hold-back cable 262 can be automatically operated through the winch 170 itself so as to operate in conjunction therewith for preventing an overtipping of the wall 36. When the raising of the wall 36 is complete, the block 162 is disengaged and the spreader unit 30 dismantled with the individual spreader sections 32 being easily lowered to the ground or slid down on, for example 2 x 12 planks. The apparatus is, upon disengaging the gin pole 112 from the base 124, ready for convenient movement to another location.

Figure 12:
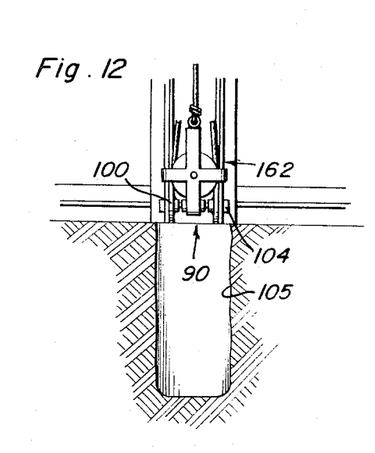
FIGURE 12 is a partial elevational view illustrating the engagement between the lifting unit pulley system and the lift column of the spreader unit.
Figure 13:
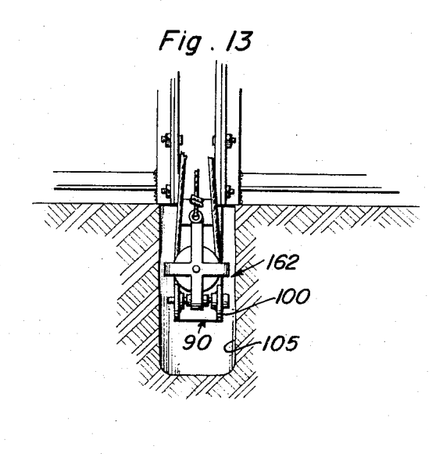
FIGURE 13 is a view similar to FIGURE 12 illustrating the manner in which the lift column can be lowered relative to the sections of the spreader unit so as to accommodate walls of greater than normal height.

In the event the wall to be lifted by the specific lifting apparatus 110 is of a greater height than the normally contemplated height, the effective length of the lifting apparatus 110 can be increased, either by an actual lowering of the lift column 90 as illustrated in FIGURES 12 and 13, or by a physical extension of the length of the side columns 114 of the gin pole 112 as suggested in FIGURES 18 and 19. Further, through the unique spreader unit sections 32 of the instant invention, it is possible to tilt up walls of any contemplated length by merely locating lift columns 90 at the points of equal weight distribution and associating spreader sections 32 with each lift column 90 in the manner detailed supra, thereby providing in effect a series of spreader units which in turn can be interlocked by elongated tension bolts, cables or rods. Next, a gin pole 112 is associated with each lift column with the pressure lines from the hydraulic motor associated with the plurality of gin poles being engaged with a common source of power. In this manner, a single operator, controlling the pump, can effect the introduction of pressurized fluid to all of the hydraulic motors simultaneously, this in turn resulting in a simultaneous operation of all of the winch units so as to produce a uniform lift force throughout the length of the wall, enabling the maintaining of the wall straight throughout the lifting operation. The use of the hydraulic motors in a multiple lift operation is deemed particularly significant in that the simultaneous introduction of the fluid from a common source into all the motors results in an equalization of the pressure in the motors due to the fluid seeking the line of least resistance. Thus, any ground softness, etc. will be automatically compensated for prior to an actual raising of the wall which is accomplished equally through all the units. Such a multiple lift operation, if attempted by conventional lift cranes would be extremely difficult, if in fact at all possible due to the necessity of using plural operators and attempting to synchronize their operation of the individual lifting means while compensating for varying ground conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for tilting up preformed walls from a horizontal position to a vertical erected position, said apparatus including a weight spreader unit and a cooperating lifting unit, said weight spreader unit comprising a plurality of elongated generally planar vertically orientated sections, means for releasably interlocking said sections in longitudinal alignment with each other, said sections being positionable against a first edge of the horizontally positioned wall which corresponds to the top of the erected wall, means for fixing the lower portion of said sections to said first edge, and a vertically extending lift column rigidly fixed between adjacent sections at approximately the center of the spreader unit, said lift column including means adjacent the lower end thereof selectively engageable by the lifting unit for effecting a tilting up of the wall through a distribution of the lifting force throughout the length of the wall by the spreader unit.

2. A self-balancing lifting unit comprising a pair of elongated laterally spaced parallel legs, rigid cross bracing extending between and connecting said legs, said cross bracing being offset to one side of the common plane of the legs, said legs being adapted to straddle a lift point on a load extending generally toward the other side of the common plane of the legs, and cable and pulley means mounted between said legs, said cable and pulley means including at least one crown pulley mounted between the legs adjacent the upper ends thereof, and cable mounted means releasably engageable with the lift point between the legs adjacent the lower end thereof for a vertical raising of the lift point along the legs, and a corresponding upward tipping of the load, said legs being hingedly mounted at their lower ends for movement in a plane perpendicular to the common plane of the legs.

3. The apparatus of claim 1 wherein each section of the spreader unit consists of a rigid enlarged open rectangular frame having vertical side rails, horizontal top and bottom rails and cross bracing extending between said rails, said vertical side rails including planar outer faces engageable flush against the planar faces of the vertical side rails of adjacent sections, and bolt receiving apertures through said side rails for the reception of locking bolts therethrough, said bolts constituting the means for releasably interlocking said sections.

4. The apparatus of claim 3 wherein the means on the lift column selectively engageable by the lifting unit comprises an elongated horizontally orientated pin releasably mounted on the lift column, said lifting unit comprising a gin pole and base means positionable on the ground adjacent the first edge of the horizontally positioned wall, means pivotally engaging the lower end of said gin pole with said base means for pivotal movement in a vertical plane perpendicular to said first edge, said gin pole including pulley and cable means thereon, said pulley and cable means being releasably engageable with the lift column pin, and means for activating said pulley and cable means for effecting a tilting up of the wall about its second or lower end through the weight spreading unit.

5. The apparatus of claim 4 including an elongated spring-loaded hold-back member pivotally fixed at one end to the gin pole at an intermediate point therealong, said hold-back member projecting rearwardly at an angle from said gin pole for anchored engagement with the ground.

6. The apparatus of claim 5 including elongated tensioned tie means fixed to the spreader unit and projecting forwardly therefrom for engagement with the second or lower edge of the wall.

7. The apparatus of claim 6 including a gin pole brace means engageable at one end with the second end of the wall, the second end of said brace means being orientated substantially vertically above the lift column for engagement with the front of the gin pole when the wall is horizontally orientated.

8. The apparatus of claim 4 wherein said lift column is vertically adjustable between the adjacent sections and selectively projectable below the first edge of the horizontally positioned wall.

9. The apparatus of claim 8 including means for adjustably varying the length of the gin pole.

10. The apparatus of claim 4 including means for adjustably varying the length of the gin pole, said last mentioned means including selectively extensible members engaged between the lower end of the gin pole and the base.

11. The apparatus of claim 4 wherein said means for activating the pulley and cable comprises winch means operatively associated with the pulley and cable means, and a hydraulic remotely controllable motor powering said winch.

12. The apparatus of claim 4 wherein said gin pole consists of a pair of elongated spaced parallel side columns, and transversely extending brace means rigidly interconnecting said side columns, thereby presenting a thin generally planar unit.

13. The apparatus of claim 12 including a pair of bracing outriggers, one outrigger being fixed to each gin pole side column at an intermediate point therealong and projecting outwardly and downwardly therefrom at an angle in substantially the plane of the aforementioned planar unit, the outer lower end of each outrigger being pivotally engaged with the base means, said pulley and cable means including first pulley means mounted between the gin pole side columns adjacent the upper ends thereof, cable means wound thereover and depending therefrom, and second pulley means suspended vertically below the first pulley means by said cable means, said second pulley means being releasably engageable with the lift column pin.

14. The apparatus of claim 3 including means for limiting and controlling the forward tilting of the wall as a balance point is reached during the tilt up operation.

15. The apparatus of claim 1 including extension plates fixed to the spreader sections and projecting therefrom for engagement with irregularly shaped wall top edges.

16. The apparatus of claim 1 including plural spreader units longitudinally spaced along the top edge of a wall with the centers of each spreader unit corresponding to the points of equal weight distribution of the wall, a lifting unit operatively associated with each spreader unit and supplied with the hydraulic motor, and a single pressurized fluid source simultaneously supplying all of the hydraulic motors for effecting an equalization of the pressures therein prior to and during the lifting operation.

17. Apparatus for tilting up preformed walls about the lower edge thereof from an initial horizontal position to a final vertical position, including a lifting means and a spreader means engageable between the top edge of the wall and the lifting means for distributing the lifting force throughout the length of the wall, said lifting means comprising an elongated base positionable parallel with an adjacent to the top edge of the wall, an elongated substantially planar gin pole, said gin pole consisting of a plurality of elongated rigidly interconnected structural members oriented substantially coplanar with each other and spaced longitudinally along said elongated base, the lower end of each member being pivotally engaged with the base in a manner so as to enable movement of the gin pole in a vertical plane perpendicular to the elongated base, and a pulley and cable system on said pole including a power driven winch.

18. The apparatus of claim 17 wherein said spreader means includes a central vertically elongated lift column engageable with the pulley and cable system, and a plurality of interchangeable releasably interconnected vertical sections extending in longitudinal alignment from each side of the lift column, said sections including tension accommodating members orientated along imaginary lines extending from vertically spaced points on the lift column to longitudinally spaced points on the top edge of the wall.

19. The apparatus of claim 18 wherein said lift column includes a pair of laterally projecting flanges adjacent the lower end thereof, and an elongated lift pin extending between and supported by said flanges just rearward of the vertical plane of the spreader means and in substantial vertical alignment with pulley and cable system when the gin pole is vertically orientated.

20. The apparatus of claim 1 wherein said lifting unit comprises a gin pole and means for pivotally engaging the lower end of said gin pole adjacent the first edge of the horizontally positioned wall for pivotal movement in a vertical plane perpendicular to said first edge, said gin pole including selectively activated means engageable with the means adjacent the lower end of the lift column for effecting a tilting up of the wall about its second or lower end through the weight spreading unit.

21. The apparatus of claim 2 wherein said lifting unit includes an elongated spring-loaded hold-back member pivotally fixed at one end thereof to an intermediate point along the parallel legs, said hold-back member projecting toward said one side of the common plane of the legs for anchored engagement with the ground.

22. The apparatus of claim 2 including means for adjustably varying the length of said parallel legs, said last mentioned means including selectively extensible members engaged with the lower ends of the legs for selective extension therebelow.

23. The apparatus of claim 2 including a pair of bracing outriggers, one outrigger being fixed to each leg at an intermediate point therealong and projecting outwardly and downwardly therefrom at an angle substantially in said common plane, the outer lower end of each outrigger being pivotally mounted.

24. An apparatus for tilting a preformed wall from a horizontal position to a vertical erected position, said apparatus including a weight spreader unit and a cooperating lifting unit, said weight spreader unit comprising elongated generally planar vertically orientated section means, said section means being positionable against the first edge of the horizontally positioned wall which is to define the top of the erected wall, means for fixing the lower portion of said section means to said first edge at spaced points along the length of said section means and in a manner whereby a substantial portion of said section means projects vertically above said first edge, said section means including a lift member fixed thereto centrally thereof and adjacent the lower edge for selective engagement by the cooperating lifting unit so as to effect a tilting up of the wall through a distribution of the lifting force throughout the length of the wall correspondling to the length of the section means.

25. The apparatus of claim 24 wherein said section means comprises a plurality of elongated generally planar vertically orientated sections, and means for releasably interlocking said sections in longitudinal alignment with each other.

References Cited by the Examiner

UNITED STATES PATENTS

| | | | |
|---|---|---|---|
| 1,798,456 | 3/1931 | Carroll | 214—130 |
| 2,327,015 | 8/1943 | Carlson | 212—144 |
| 2,836,054 | 5/1958 | Brauer. | |
| 2,921,697 | 1/1960 | Holmes | 212—44 |

FOREIGN PATENTS

| | | |
|---|---|---|
| 248,968 | 1/1964 | Australia. |
| 7,950 | 2/1936 | France. |
| 1,247,901 | 10/1960 | France. |
| 637,912 | 5/1950 | Great Britain. |

MARVIN A. CHAMPION, *Primary Examiner.*